F. A. BRAGG.
AUTOMOBILE TIRE AND METHOD OF MAKING THE SAME.
APPLICATION FILED NOV. 12, 1917.
1,275,523.
Patented Aug. 13, 1918.
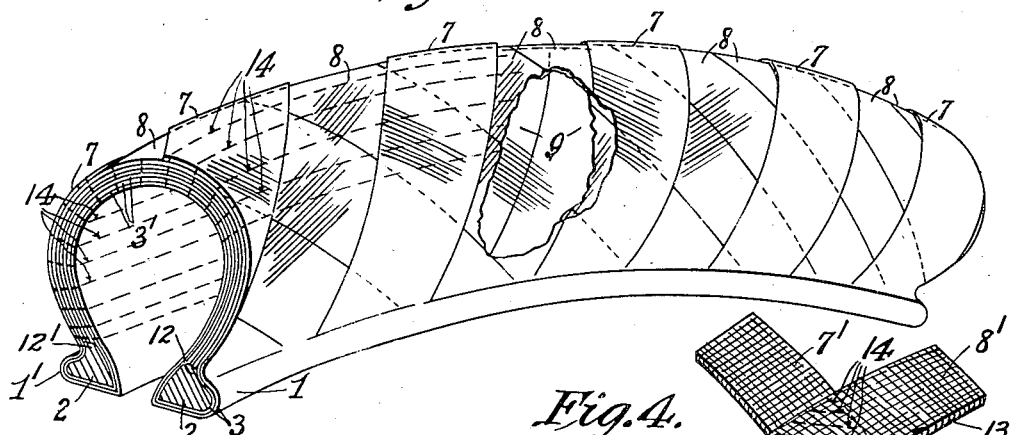
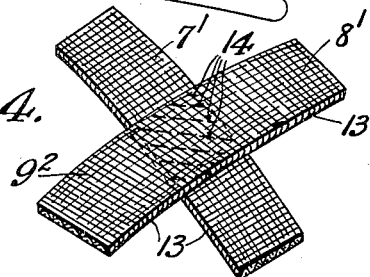
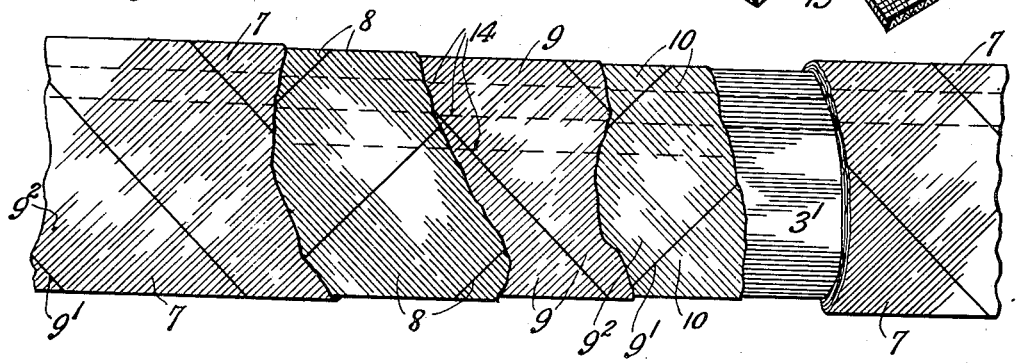
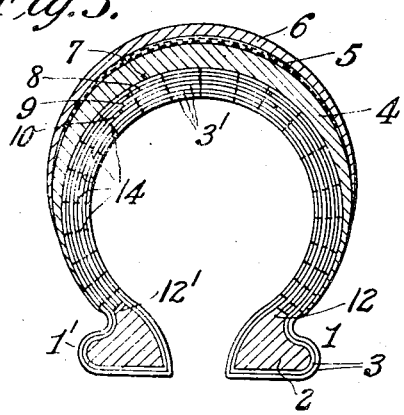
WITNESS:
R. M. Mowry
INVENTOR.
Frederick A. Bragg.
BY
Harry W. Bowen.
ATTORNEY.

UNITED STATES PATENT OFFICE.

FREDERICK A. BRAGG, OF SPRINGFIELD, MASSACHUSETTS.

AUTOMOBILE-TIRE AND METHOD OF MAKING THE SAME.

1,275,523.

Specification of Letters Patent. Patented Aug. 13, 1918.

Application filed November 12, 1917. Serial No. 201,429.

*To all whom it may concern:*

Be it known that I, FREDERICK A. BRAGG, a citizen of the United States of America, residing at Springfield, in the county of Hampden and State of Massachusetts, have invented certain new and useful Improvements in Automobile-Tires and the Methods of Making the Same, of which the following is a specification.

This invention relates to improvements in automobile tires of the type shown, described and claimed in Letters Patent of the United States granted to me April 14, 1908, and numbered 884,562.

My present invention is designed to materially strengthen the casing or tire body, by arranging several layers of strips of friction cloth at an angle to each other. These several layers are placed over the layers of fabric that form the built up portion of the tire. Friction cloth is a well known material of which pneumatic tires are constructed and consists of canvas or other closely woven fabric which is coacted with a rubber solution in order to make the same adherent and to constitute a homogeneous mass after the same is vulcanized.

In the present invention, instead of arranging the layers of fabric in the same direction, I employ strips of friction cloth having a selvaged, or finished edge that are located or arranged at a suitable angle to each other. These strips are secured together and to the inner body portion of the tire by stitching with a thread which is preferably saturated with a rubber solution. The tire is then completed by applying the rubber cushion portion, the breaker strip and tread, after which the whole is vulcanized in molds designed for that purpose. It is to be understood, however, that I do not limit myself in this application to the use of a thread that is saturated with a rubber solution, as I may use or employ a thread that is not so treated.

The present invention is designed to improve the construction of pneumatic tires so that they will be greatly strengthened by reason of the diagonal arrangement of the strips of friction cloth. These strips are formed with a selvaged, or finished edge whereby when the tire is stitched together and vulcanized, the selvaged edge will serve to very materially strengthen the finished product. The diagonal, or angular arrangement of the layers of friction cloth act substantially in the same manner as the tie-bars in mechanical structures as bridges or roofs, by transmitting the load or stress to distant points where they are taken up and distributed, thus preventing breakage where the load is applied.

Referring to the drawings:

Figure 1 is a perspective of the tire before the tread, breaker strip and cushion are applied and showing the diagonal manner of arranging the friction fabric, also the stitching for securing the same to the inner part of the casing.

Fig. 2 is a plan view of Fig. 1 showing portions of the tire broken away to illustrate the diagonal arrangement of the friction fabric and the threads for securing the fabric together.

Fig. 3 is a transverse sectional view of the finished tire taken at right angles to the axis, and Fig. 4 is a detail view illustrating the manner of arranging and crossing the layers of friction fabric and also showing the selvaged edge of the fabric.

Referring to the drawings in detail, 1 and 1' designate the usual tread portion of the tire of the clencher type, 2 the filler of hard rubber or other suitable material around which the layers 3 of friction fabric are wrapped and which extends upward into the curved or crown portion 3' of the tire; 4 designates the rubber cushion part of the tire; 5 the breaker strip and 6 the tread portion. Located between the layers of fabric 3 and the rubber cushion 4 is a series, or plurality of diagonally arranged strips of friction cloth. These strips are indicated by the reference numerals 7, 8, 9 and 10, in Fig. 2, and in detail in Fig. 4 by the numerals 7', 8'. As shown, several layers of these strips are employed. They extend from the upper part 12 of the tread 1 upward and across the curved or crown part 3' to the oppositely located tread 1', as clearly indicated in Figs. 1 and 3. Their angular position with relation to each other is clearly indicated in Figs. 2 and 4. As shown, these strips are arranged at substantially 90 degrees to each other. The angle, however, is merely illustrative. The edges 9' of the strips 7, 8, 9 and 10 are cut at an angle to the threads $9^2$ of the strips. After the layers of fabric 3 are in place, the strips of diagonally arranged layers of friction cloth are applied as shown in Figs, 2 and 4. The edges and ends of these strips have a finished or selvaged edge as indicated at 13. After the layers of strips of friction cloth 7, 8, 9 and 10 are applied over each other in the diagonal manner shown, they are secured in place by stitching the same to the inner layers of fabric, indicated at 3 and 3'. The stitches pass through to the inner surface of the inner layers of fabric 3 and are indicated by the dotted lines 14. The thread composing these stitches may, if desired, be first saturated with a solution or solvent of rubber in order to make them permanently adherent to the layers of friction cloth and to the layers of fabric 3. The rubber cushion 4, breaker strip 5 and tread 6 are next applied in the building up process. The whole is then subjected to heat for vulcanization, this process being carried out by suitable molds in the well known manner.

By arranging the strips 7, 8, 9 and 10 of friction cloth in the crossed manner and then stitching the same to the inner layers of fabric 3, the tire is very materially strengthened, since this arrangement possesses the property of transmitting the stresses and strains incident to the tire usage over a large area of the tire structure. In other words the pull or tensile strain on the diagonally arranged strips extends throughout their entire length to the other portions of the tire and in effect binds the whole structure together. Since there are several layers or strips of friction cloth which cross each other and are secured together by stitching, which pass to the interior of the tire, as shown in Figs. 1 and 3, it is clear that the stresses and strains are taken up over a large area and that there is less liability of the tire being ruptured under abnormal pressure. Such breakages are usually termed "blow-outs."

The stitches 14 which pass through the strips of friction cloth where they engage the selvaged or finished edges 13 will be prevented from working loose as they might otherwise do if the strips of friction cloth with a raw edge, or unfinished edge, were used. In other words, the stitches and finished edges 13 are, as it were, locked together.

It will be seen from this construction that I have produced a pneumatic tire that is very firmly secured together by reason of the use of strips of fabric cloth having selvaged edges, said strips being arranged at angles to each other and then stitched to the inner layers of fabric composing the tire, and that the angular arrangement of these strips serves to transmit, take up and distribute the internal strains and stresses of the tire, such strains and stresses being distributed over a large area serving in a large measure to prevent blow-outs and punctures. The threads cannot break loose or tear away from these strips on account of the finished edges and ends of the strips.

What I claim is:

1. A pneumatic tire having inner layers of fabric and separate layers of strips of friction cloth, the strips of friction cloth being arranged at an angle to each other and secured to the inner layers of fabric by stitching, said separate layers serving to distribute the strains and stresses incident to use over a large area of the tire body.

2. A pneumatic tire comprising a plurality of layers of fabric, a plurality of separate layers of strips of fabric arranged at an angle to each other and secured to the first mentioned layers by stitching, said second mentioned layers of fabric having selvaged or finished edges for securely locking the stitches thereto.

3. A pneumatic tire, comprising in combination, a plurality of inner layers of fabric, a plurality of separate layers of strips of friction cloth with finished edges and ends and arranged at an angle to each other and located over the inner layers, stitches saturated with a rubber solution, or solvent, passed through and through the said layers for binding the same together for distributing the strains and stresses over a large area of the tire.

4. In a pneumatic tire, a casing having layers of strips of fabric that are secured together by stitching, some of said strips having finished edges and ends for locking the stitches thereto, and also having their edges arranged at an angle to the threads of the fabric.

5. The method of building up a pneumatic tire which consists in placing a plurality of layers of strips of fabric one above the other to form the inner portion of the casing, then placing a plurality of layers of strips of fabric over said layers and at an angle to each other, then securing said layers of strips together by stitches which extend in a direction parallel to the axis of the tire, then applying the cushion and tread portion and finally vulcanizing the whole.

6. A tire comprising a body made up of a plurality of layers of flexible fabric and layers of strips of friction cloth arranged at an angle to each other and all of said layers being stitched through and through with a thread, or the like, saturated with a rubber solution to make the layers permanently adherent to the layers after vulcanization.

7. A tire comprising a body made up of diagonally disposed strips of layers of friction cloth and reinforced by stitching the same together, said strips terminating on opposite sides of the tire.

8. A tire comprising a body made up of diagonally disposed strips of friction cloth in superimposed positions with relation to each other, said strips having finished edges, and stitches passed through the strips, including the finished edges, to lock and retain the diagonally disposed strips in place, as described.

9. A tire composed of layers of flexible fabric and layers of strips of friction cloth with finished edges and disposed over the layers of fabric, and stitches passed through and through all of said layers to bind the whole together, the finished edges serving to firmly retain the stitches and lock them in place and bind the whole mass together.

10. A tire comprising a body portion composed of layers of fabric and layers of friction cloth strips diagonally disposed with relation to each other, said strips having finished sides and ends, stitches passed through and through the layers and the finished sides and ends for the purpose of retaining the same in place.

FREDERICK A. BRAGG.